No. 660,120. Patented Oct. 23, 1900.
J. F. NEAL.
PLATE OR PAN LIFTER.
(Application filed Mar. 21, 1900.)
(No Model.)
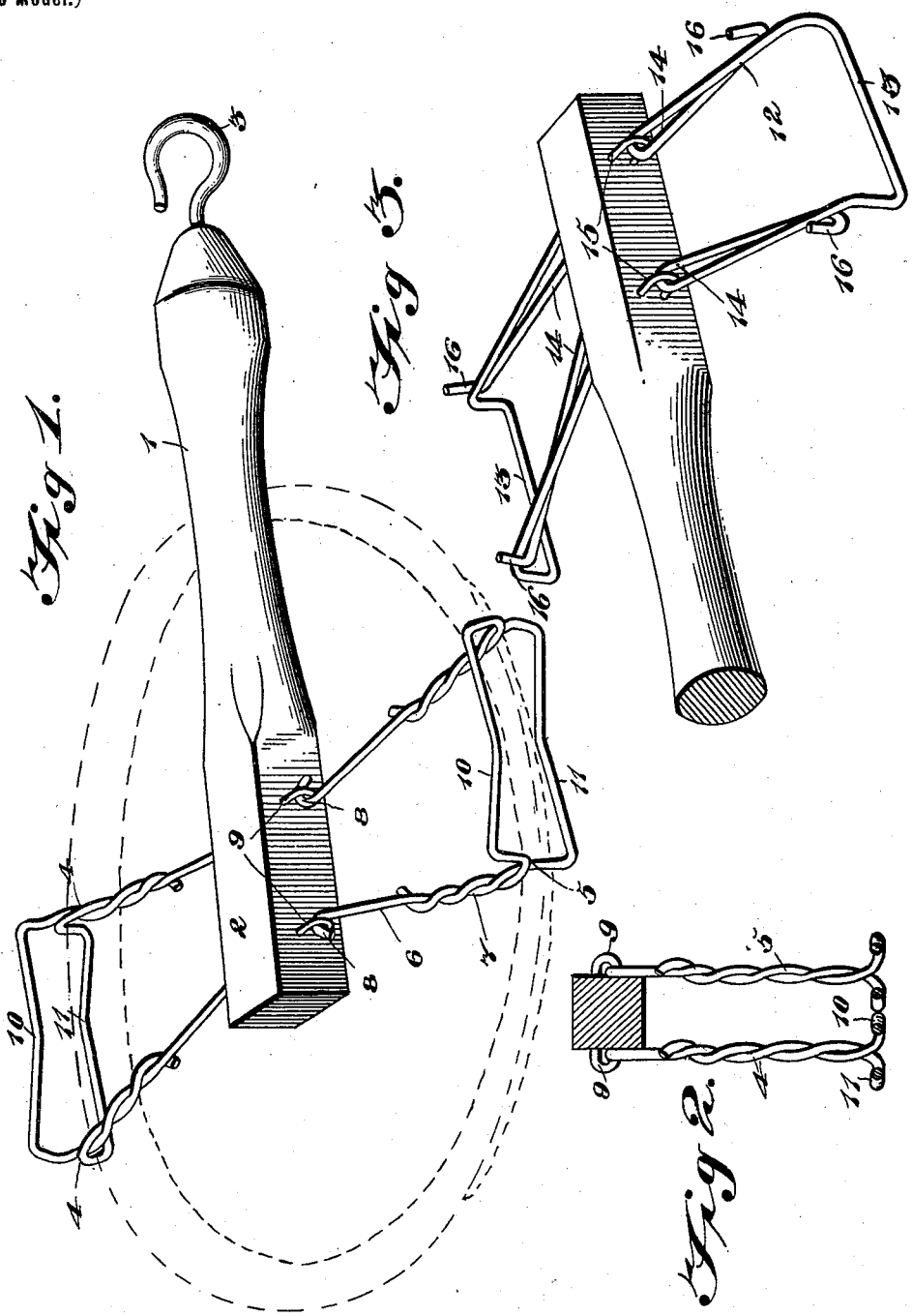
Witnesses
John Maupin
John F Neal Inventor
By his Attorneys,
C A Snow & Co.

UNITED STATES PATENT OFFICE.

JOHN F. NEAL, OF KOKOMO, INDIANA.

PLATE OR PAN LIFTER.

SPECIFICATION forming part of Letters Patent No. 660,120, dated October 23, 1900.

Application filed March 21, 1900. Serial No. 9,555. (No model.)

*To all whom it may concern:*

Be it known that I, JOHN F. NEAL, a citizen of the United States, residing at Kokomo, in the county of Howard and State of Indiana, have invented a new and useful Plate or Pan Lifter, of which the following is a specification.

This invention relates to plate and pan lifters, and has for its object to provide an improved device of this character which is designed to firmly grip the opposite edges of the rim of the plate or pan, so that the latter may be elevated and conveniently carried from one place to another without danger of burning the hands by contact with the pan or plate and without exposing the hands to steam or hot vapors arising from the pan. It is furthermore designed to provide a reversible device, so that the lifter may be conveniently operated in whatever position it may be picked up by the operator.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a pan and plate lifter constructed and arranged in accordance with the present invention. Fig. 2 is a detail sectional view taken transversely through the opposite jaws of the device when the latter is not in use. Fig. 3 is a perspective view of a modified form of the lifter.

Corresponding parts in the several figures of the drawings are designated by like characters of reference.

Referring to the accompanying drawings, 1 designates the handle of the device, which is in the form of a straight stick of wood, having one substantially-rectangular end 2, the remaining portion thereof being rounded and formed to fit the palm of the hand. At the end of the handle, which is opposite the rectangular portion thereof, is a hook or eye 3, whereby the lifter may be hung up when not required for use.

At opposite sides of the handle and at the rectangular end thereof is a pair of pivotal or swinging jaws 4 and 5, which are loosely connected to opposite flat sides of the rectangular end of the handle. These jaws are duplicates in shape and construction, and each jaw is formed from two pieces of wire 6 and 7. The piece 6 is bent intermediate of its ends into a substantial U-shaped jaw, the extremities thereof being bent into hooks or eyes 8, which are designed to loosely engage the eyes or staples 9, that are driven into the adjacent side portion of the rectangular end of the handle. The transverse portion, which connects the opposite sides of the jaw, is bent laterally, so as to form a lip 10, which is disposed at substantially right angles to the plane of the sides of the jaw.

By reference to Fig. 1 of the drawings, in which a pan or plate is indicated by dotted lines, it will be observed that the lips of the opposite jaws are designed to engage beneath or embrace the respective edge portions of the rim of the plate or pan, so that the weight of the latter will draw the jaws inwardly upon their loose or pivotal connection with the handle, and thereby firmly grip the jaws upon the plate or pan. It will be understood that the handle may be as long as desired, so that the hand of the operator may not be directly over the top of the pan or plate, and by this arrangement the hand is not exposed to the steam or hot vapor arising from the pan or plate.

In order that the device may be reversible, the other wire 7 is bent into substantially U shape to correspond with the shape of the jaw and has its opposite sides intertwisted with the respective sides of the jaw, and its transverse portion 11 is bent laterally in a direction opposite to the lip 10, so as to form a lip upon the opposite side of the jaw. By this arrangement the jaws may be swung to either side of the handle, and in either position of the jaws the inner lips thereof will engage the plate or pan to effectively lift the latter.

In the modified form of the device shown in Fig. 3 of the drawings each jaw is provided from a single piece of wire, which is bent intermediate of its ends into a substantially U-shaped jaw 12, the transverse portion of which is bent laterally to form a lip 13, in substantially the same manner as described and shown for the first-mentioned jaw. The opposite sides of the jaw are bent into hooks or eyes 14 for engagement with the staples 15 in the adjacent side of the handle, and the extremities of the wire are twisted upon the side portions of the jaw and then bent laterally outward, as at 16, to form lips extending in a direction opposite to that of the lip 13, and both of these lips have substantially the same relation as the lips of the other jaw. It will now be seen that the lips 16 will operate in the same manner as the other lips to embrace the edge of a pan or plate.

What I claim is—

1. A pan and plate lifter, comprising a handle, and a pair of swinging jaws carried by the handle, and reversible to operate at opposite sides of the handle.

2. A pan and plate lifter, comprising a handle, and a pair of opposite swinging jaws carried by the handle and reversible to opposite sides of the handle, each jaw having a pair of oppositely-extending lips for engagement with the rim of a pan or plate.

3. A pan and plate lifter, comprising a handle, and a pair of opposite swinging jaws carried by the handle and reversible to opposite sides of the handle, each jaw comprising a substantially U-shaped wire, having its transverse portion bent laterally to form a lip, and a second substantially U-shaped wire, having its opposite side portions intertwisted with the respective side portions of the former wire, and its transverse portion bent laterally outward opposite to the similar portion of the other wire.

In testimony that I claim the foregoing as my own I have hereto affixed my signature in the presence of two witnesses.

JOHN F. NEAL.

Witnesses:
A. W. MOORE,
SANDO WHITE.